UNITED STATES PATENT OFFICE.

WILLIAM MORRISON, OF DES MOINES, IOWA.

PROCESS OF BINDING THE ACTIVE MATERIAL OF POSITIVE-POLE LEAD ELECTRODES.

1,021,996.     Specification of Letters Patent.     Patented Apr. 2, 1912.

No Drawing.     Application filed February 24, 1912. Serial No. 679,703.

*To all whom it may concern:*

Be it known that I, WILLIAM MORRISON, a citizen of the United States, residing at Des Moines, in the county of Polk and State of Iowa, have invented certain new and useful Improvements in Processes of Binding the Active Material or Positive-Pole Lead Electrodes, of which the following is a specification.

This invention relates to the production of a permanent and insoluble binder for the active material of the positive-pole electrodes of lead storage batteries. This binder fundamentally comprises an oxygen compound of niobium, a metal which is incapable of directly replacing hydrogen in a sulfuric acid solution; insoluble by anodic oxidation in a sulfuric acid solution; incapable of cathodic reduction to metal, or of electrolytic separation as metal, in a sulfuric acid solution; and capable of forming complex anions with electronegative elements, which can constitute the acidic radical of compounds having lead as a base.

To illustrate the invention, there will first be described an electrolytic process of producing a lead-peroxid electrode employing a compound of niobium as the binder. For this purpose, a metallic support, for example a grid of antimonial lead, is pasted or filled with the usual mixture of minium, litharge and a sulfuric acid solution, in which mixture lead sulfate forms as a provisional binder. Complete formation, or peroxidation, of the active material is then preferably initially effected by placing the pasted grids, alternately with unfilled grids serving as dummy electrodes of the opposite polarity, in a sulfuric acid solution having a specific gravity of 1.200 to 1.250 and passing an electric current through the solution, alternately in opposite directions, until the paste has been sufficiently expanded, care being taken not to force the discharge beyond the normal intended capacity of the electrodes. The formed and dummy electrodes are then removed from the sulfuric acid solution and placed in a cell containing water, and electric current is passed from the filled electrodes to the dummies until the free acid in the active material has been removed. The electrodes and dummies are then removed, rinsed in water, and placed in a strong aqueous solution of an alkali-metal niobate, for example potassium hexaniobate. An electric current is then passed from the filled electrodes through the solution to the dummies, and is continued for several hours, thereby causing niobium ions, presumably complex niobium-oxygen ions, to penetrate the active material to any desired degree and to combine chemically with the lead-oxygen compounds thereof, and particularly with the lead-sulfate which serves as the provisional binder in the electrode. The electrodes and dummies are then removed, rinsed in water, placed in a sulfuric acid solution having a specific gravity of about 1.300, and an electric current is passed from the electrodes to the dummies until all of the soluble constituents of the active material have been removed or rendered insoluble. The electrodes are then discharged to the extent of their normal capacity, and thereafter recharged, preferably to somewhat less than their full capacity, in another sulfuric acid solution of 1.280 specific gravity, the effect of such incomplete recharging being to leave in the plate a certain proportion of lead sulfate to combine with the niobium ions on a repetition of the treatment, should such repetition be desired, for the purpose of impregnating the active material with an additional amount of the binder compound. At the conclusion of the treatment the positive-pole electrodes are mounted in connection with the regular negative plates, and receive their full normal charge.

The object of performing the preceding operations with dummy electrodes instead of with the regular battery electrodes is to prevent injury to the latter by absorption of the niobium compound or by deposition of impurities therein.

Positive-pole electrodes prepared as described are not suited for forming negative electrodes by reversal, since negative electrodes thus formed undergo discharge by local action. Nevertheless, any accidental reversal causes no particular injury to the electrode.

The niobium-oxygen anion appears to play the same rôle in the binder compound as does the sulfur-oxygen anion in the ordinary lead electrodes in which lead sulfate constitutes the binder. The lead-niobium-oxygen compound is however, as compared with the lead sulfate heretofore commonly used as a binder, very permanent and insoluble. The niobium compound has a considerable capacity for binding sulfuric acid, in charging a battery having positive-pole electrodes bound by such compound. The electrolytic method of binding the active material especially impregnates the superficial portions with the binder, thereby giving it a shell or crust of active material permanently and durably bound by a very insoluble compound.

The initial formation of the electrodes may be omitted and the filled grids may be at once treated in the niobium solution to impregnate the active material with the binder, formation being subsequently effected. Such subsequent formation, however, consumes a much larger amount of current than does initial formation.

While the described electrolytic process of impregnation is an efficient and operative one, it is sometimes preferable, particularly with thick plates, in order to more uniformly distribute the binder throughout the active mass, to incorporate a portion of the binder with the active material by another method, which will now be described. This method consists in forming an aqueous solution of a suitable lead salt, as lead nitrate or acetate, adding potassium hexaniobate, or hexaniobate plus hexatantalate, until all the lead is precipitated as a niobium-oxygen compound, or mixture of niobium-oxygen and tantalum-oxygen compounds, separating the precipitate and washing it with dilute sulfuric acid, then boiling it in strong sulfuric acid, and washing it with water. The precipitate may be heated, in order to give it a denser body. The desired proportion of this product, say from six to ten per cent. or more, is very thoroughly mixed with the minium-litharge paste, as by grinding the materials together. The positive-pole electrode treated by this preliminary method should receive a prolonged and strong charging treatment in sulfuric acid, with dummy negatives, before assembling in the battery, in order to remove or to render insoluble any remaining soluble components of the plate. The electrode is then finished by the electrolytic method heretofore described, that is, by connecting it as the anode in a solution of a niobate, to impregnate the active material, and especially the outer portions thereof, with a binder-compound containing niobium.

It is to be understood that the several foregoing examples are illustrative in character, and that the invention is not limited to the details of manipulation or to the strength or proportions of reagents recited; and it is also to be understood that the positive-pole electrodes may be prepared by methods other than those herein specifically described without departure from my invention. The active material of Planté electrodes, formed out of solid lead, may also be bound by employing them as anodes in a solution of a niobate.

I claim:

1. In a process of binding the active material of positive-pole lead electrodes, the step which consists in electrolytically impregnating the active material with a compound containing niobium in its acidic radical.

2. In a process of binding the active material of positive-pole lead electrodes, the step which consists in passing an electric current from the electrode through a solution of a niobate, thereby impregnating the active material with a niobium compound.

3. The process of binding the active material of positive-pole lead electrodes, which consists in passing an electric current from the electrode through a solution of a niobate, thereby impregnating the active material with a niobium compound, and thereafter reacting on said compound with sulfuric acid.

4. The process of binding the active material of positive-pole lead electrodes, which consists in passing an electric current from the electrode through a solution of a niobate, thereby impregnating the active material with a niobium compound, and thereafter electrochemically reacting on said compound with sulfuric acid.

5. The process of binding the active material of positive-pole lead electrodes, which consists in passing an electric current from the electrode through a solution of a niobate, thereby impregnating the active material with a niobium compound, and thereafter electrochemically reacting on said compound with sulfuric acid.

6. The process of binding the active material of positive-pole lead electrodes, which consists in reacting on a solution of a lead salt with a compound or compounds of a metal or metals incapable of directly replacing hydrogen in a sulfuric acid solution; insoluble by anodic oxidation in a sulfuric acid solution; incapable of cathodic reduction to metal, or of electrolytic separation as metal, in a sulfuric acid solution; and capable of forming complex anions with electronegative elements, which can constitute the acidic radical of compounds having lead as a base, mixing the reaction-product with the active material, applying the mixture to a support to constitute an electrode, passing an electric current from the electrode through a solution of a niobate, thereby impregnating the active material with a compound of niobium, and electrochemically reacting on said compound with sulfuric acid.

7. The process of binding the active material of positive-pole lead electrodes, which consists in reacting on a solution of a lead salt with a compound of niobium, mixing the reaction-product with the active material, applying the mixture to a support to constitute an electrode, passing an electric current from the electrode through a solution of a niobate, thereby impregnating the active material with a compound of niobium, and electrochemically reacting on said compound with sulfuric acid.

8. The process of binding the active material of positive-pole lead electrodes, which consists in reacting on a solution of a lead salt with compounds of niobium and tantalum, mixing the reaction-product with the active material, applying the mixture to a support to constitute an electrode, passing an electric current from the electrode through a solution of a niobate, thereby impregnating the active material with a compound of niobium, and electrochemically reacting on said compound with sulfuric acid.

In testimony whereof I affix my signature in presence of two witnesses.

WILLIAM MORRISON.

Witnesses:
 EUGENE A. BYRNES,
 JAS. H. BLACKWOOD.

Copies of this patent may be obtained for five cents each, by addressing the "Commissioner of Patents, Washington, D. C."